(12) United States Patent
Moss, III et al.

(10) Patent No.: US 10,197,203 B2
(45) Date of Patent: Feb. 5, 2019

(54) HEATED FLUID CONDUIT

(71) Applicant: GATES CORPORATION, Denver, CO (US)

(72) Inventors: Thomas Moss, III, Colorado Springs, CO (US); Alex Warneke, Denver, CO (US); Tim Saupe, Parker, CO (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 15/597,488

(22) Filed: May 17, 2017

(65) Prior Publication Data

US 2018/0335175 A1    Nov. 22, 2018

(51) Int. Cl.
| | |
|---|---|
| *F24H 1/10* | (2006.01) |
| *H05B 3/58* | (2006.01) |
| *F16L 53/38* | (2018.01) |
| *F16L 33/207* | (2006.01) |
| *F16L 53/37* | (2018.01) |
| *F01N 3/28* | (2006.01) |
| *F16L 11/127* | (2006.01) |
| *F16L 25/01* | (2006.01) |

(52) U.S. Cl.
CPC ............ *F16L 53/38* (2018.01); *F01N 3/2896* (2013.01); *F16L 33/2076* (2013.01); *F16L 53/37* (2018.01); *F16L 11/127* (2013.01); *F16L 25/01* (2013.01)

(58) Field of Classification Search
None
See application file for complete search history.

(56) References Cited

U.S. PATENT DOCUMENTS

| | | | | |
|---|---|---|---|---|
| 1,809,714 | A * | 6/1931 | Mathews | F24H 1/142 |
| | | | | 219/522 |
| 2,683,673 | A | 7/1954 | Silversher | |
| 3,378,673 | A * | 4/1968 | Hopper | F16L 53/38 |
| | | | | 392/472 |
| 3,727,029 | A | 4/1973 | Chrow | |
| 4,156,127 | A * | 5/1979 | Sako | H05B 3/06 |
| | | | | 137/141 |

(Continued)

FOREIGN PATENT DOCUMENTS

| | | |
|---|---|---|
| EP | 1329660 A2 | 7/2003 |
| WO | 0019773 A1 | 4/2000 |

OTHER PUBLICATIONS

European Patent Office, International Search Report and Written Opinion of the International Searching Authority, application No. PCT/US2018/025564, dated Jul. 27, 2018.

*Primary Examiner* — Thor S Campbell
(74) *Attorney, Agent, or Firm* — Jeffrey A. Thurnau, Esq.; Paul N. Dunlap, Esq.

(57) ABSTRACT

A heated fluid conduit comprising a fluid conduit having a body with a conductive material disposed therein, the conductive material comprising two conductors in adjacent relation, the conductive material comprising a woven material, a first crimp connector on the end of a conductor, and a second crimp connector on the end of the other conductor, and both crimp connectors on the same end of the body, the conductors electrically connected in series by a third crimp connector at the other end of the body conduit, means for coupling an electrical power supply to each conductor to provide a voltage across said conductors and an electrical current therethrough, heating said fluid conduit.

6 Claims, 5 Drawing Sheets

(56) References Cited

U.S. PATENT DOCUMENTS

| | | | |
|---|---|---|---|
| 4,180,723 A * | 12/1979 | Szupillo | H05B 3/08 |
| | | | 174/94 R |
| 4,323,174 A | 4/1982 | Wood | |
| 4,455,474 A | 6/1984 | Jameson et al. | |
| 4,553,023 A | 11/1985 | Jameson et al. | |
| 4,581,521 A | 4/1986 | Grise | |
| 4,874,925 A | 10/1989 | Dickenson | |
| 5,381,511 A | 1/1995 | Bahar et al. | |
| 5,394,507 A | 2/1995 | Okamoto | |
| 5,428,706 A * | 6/1995 | Lequeux | F16L 53/38 |
| | | | 392/472 |
| 5,791,377 A * | 8/1998 | LaRochelle | B60S 1/488 |
| | | | 138/109 |
| 5,832,178 A | 11/1998 | Schave | |
| 5,862,303 A * | 1/1999 | Adar | F16L 47/03 |
| | | | 148/403 |
| 5,933,574 A * | 8/1999 | Avansino | F16L 53/38 |
| | | | 392/468 |
| 6,738,566 B2 | 5/2004 | Pagnella | |
| 7,266,293 B1 | 9/2007 | Dundas | |
| 7,541,542 B2 | 6/2009 | Park et al. | |
| 7,732,735 B2 | 6/2010 | Bourget et al. | |
| 7,991,273 B2 | 8/2011 | Sonderegger et al. | |
| 8,592,731 B2 * | 11/2013 | Schild | B32B 1/08 |
| | | | 219/534 |
| 9,253,821 B2 * | 2/2016 | Bremnes | H05B 3/0004 |
| 9,410,652 B2 | 8/2016 | Ellis et al. | |
| 9,644,776 B2 * | 5/2017 | Westmeier | F16L 53/38 |
| 2007/0045275 A1 | 3/2007 | Steinhauser et al. | |
| 2007/0264861 A1 | 11/2007 | Scheuermann et al. | |
| 2008/0298788 A1 * | 12/2008 | Martucci | F16L 53/38 |
| | | | 392/472 |
| 2012/0161434 A1 | 6/2012 | Wells | |

* cited by examiner

HEATED FLUID CONDUIT

FIELD OF THE INVENTION

The invention relates to a heated fluid conduit, and more particularly, to a fluid conduit having a conductive woven material, a first crimp connector on the end of a conductor, and a second crimp connector on the end of the other conductor, and both crimp connectors on the same end of the body, the conductors electrically connected in series by a third crimp connector at the other end of the body conduit.

BACKGROUND OF THE INVENTION

Selective Catalytic Reduction (SCR) vehicles, referred to in Europe as Euro V vehicles, are diesel powered motor vehicles which are compatible with the use of an operating fluid to reduce emissions. Typically, the SCR vehicle has a urea tank, separate from the fuel tank, which is used to carry an operating fluid such as an automotive urea solution, or the like. Automotive Urea Solution (AUS) is a solution of high purity urea in de-mineralized water. AUS is stored in a urea tank of an SCR vehicle and is sprayed into the exhaust gases of the vehicle in order to convert oxides of nitrogen into elementary nitrogen and water. An SCR vehicle may then advantageously satisfy various emission standards, such as the Euro V Emissions Standard.

Problematically, AUS freezes at a temperature of approximately minus eleven degrees centigrade. In order to ensure this method of reducing emissions in an SCR vehicle remains effective, the AUS needs to be maintained in a liquid state to allow injection.

SCR vehicles generally rely on a heating wire or the like, which may be molded into or wrapped around the AUS hose or line to avoid freezing of the AUS. This is a rather inefficient and inflexible solution that requires a complete redesign of the fluid line to change its heating properties. Thus, to change the heating characteristics of an internal wire assembly, another production run of the hose must be produced and the resistance per foot is changed when the hose is being extruded by either changing the wire pitch, the wire size or adding more wires into the system, or a combination of all three.

Also, oil drilling rigs are being operated in harsher environments as oil is drilled for in Alaska and the Arctic and Antarctica. It is now not unusual for a rig to start up in minus sixty degree Fahrenheit weather. This cold weather has an adverse effect on equipment and hydraulic components on a drill rig. When starting up a hydraulic machine at these cold temperatures it is not unusual for the seals to rupture in valves and cylinders.

Representative of the art is U.S. Pat. No. 9,410,652 which discloses a heated fluid conduit has a body with a semi-conductive material disposed therein with an electrical power supply coupled to the conduit to provide a voltage across the conduit and a current therethrough, heating the fluid conduit. A fluid conduit heating system comprises a semiconductive sleeve disposed over a fluid conduit and an electrical power supply coupled to the ends of the sleeve to provide a voltage across the sleeve and a resulting current through the semiconductive sleeve, heating the sleeve and conduit. Alternatively, one terminal of the electrical power supply is coupled to each end of the sleeve or conduit, and another terminal of the electrical power supply is coupled to the sleeve or conduit therebetween, to provide parallel heating circuits.

What is needed is a fluid conduit having a conductive woven material, a first crimp connector on the end of a conductor, and a second crimp connector on the end of the other conductor, and both crimp connectors on the same end of the body, the conductors electrically connected in series by a third crimp connector at the other end of the body conduit. The present invention meets this need.

SUMMARY OF THE INVENTION

The primary aspect of the invention is to provide a fluid conduit having a conductive woven material, a first crimp connector on the end of a conductor, and a second crimp connector on the end of the other conductor, and both crimp connectors on the same end of the body, the conductors electrically connected in series by a third crimp connector at the other end of the body conduit.

Other aspects of the invention will be pointed out or made obvious by the following description of the invention and the accompanying drawings.

The invention comprises a heated fluid conduit comprising a fluid conduit having a body with a conductive material disposed therein, the conductive material comprising two conductors in adjacent relation, the conductive material comprising a woven material, a first crimp connector on the end of a conductor, and a second crimp connector on the end of the other conductor, and both crimp connectors on the same end of the body, the conductors electrically connected in series by a third crimp connector at the other end of the body conduit, means for coupling an electrical power supply to each conductor to provide a voltage across said conductors and an electrical current therethrough, heating said fluid conduit.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
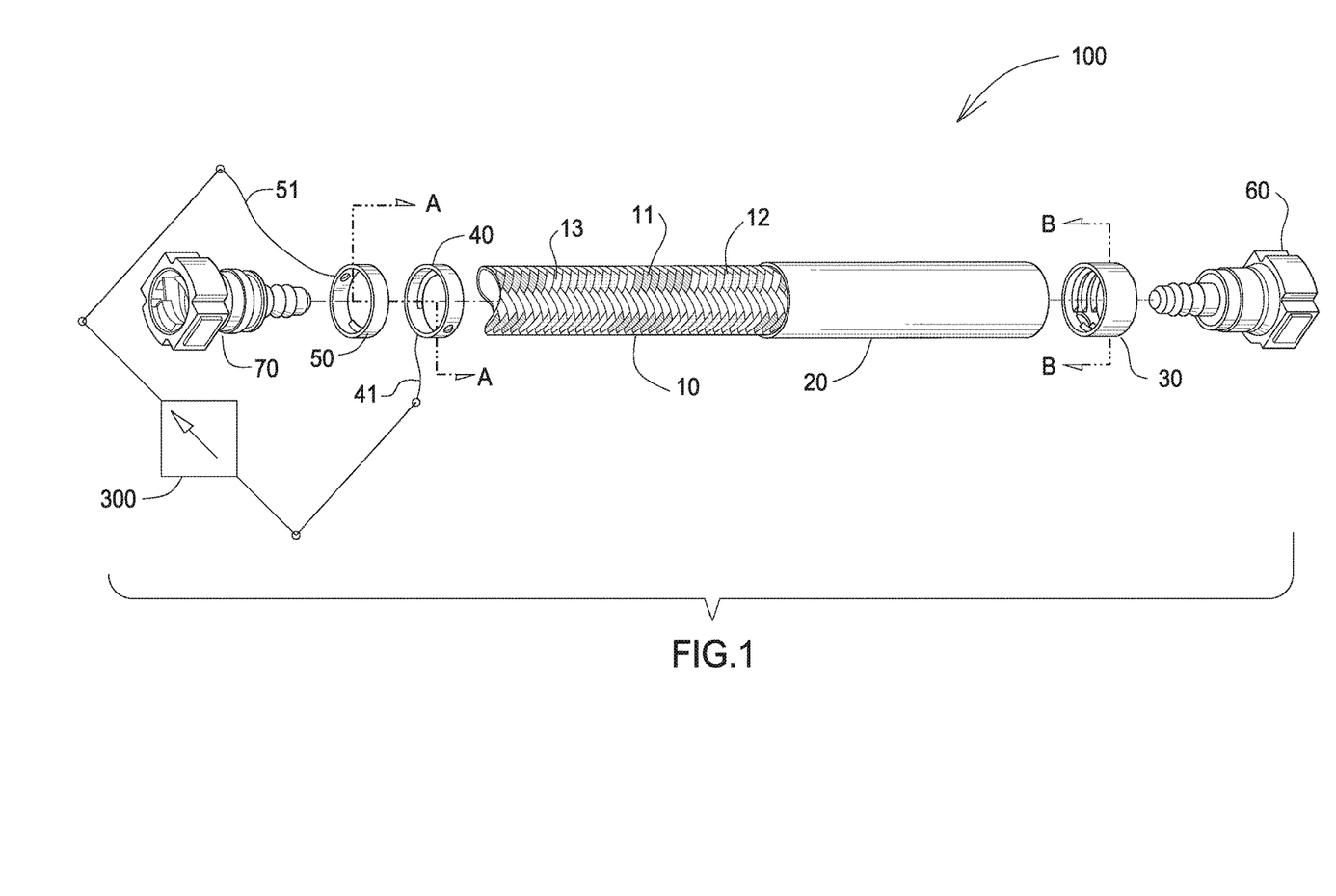
FIG. 1 is an exploded view of the inventive hose.

FIG. 1 is an exploded view of the inventive hose. A fluid conduit 100 is shown having body 20 with conductive or semi-conductive portion 10 disposed therein. The conductor material may comprise any material having a resistivity sufficient to cause heating of the material when subjected to a current flow. The material may also take the form of a woven or braided conductive or semi-conductive textile material comprising spiral braids 11 and 12. Portion 10 and braids 11, 12, may comprise conductive materials including metallic substances. Each braid 11, 12 is parallel in adjacent relation to the other and each are electrically isolated from the other by an insulating portion 13. Each braid 11, 12 comprises multiple parallel threads or strands extending the length of conduit 100. Each braid 11, 12 comprises a resistivity which results in a temperature increase upon application of an electric current. A voltage controlled current source 300, for example, a vehicle alternator or facility power supply, provides power to the conduit 100.

Portion 10 may comprise carbon fiber reinforcement material such as threads. Preferably, the carbon fiber material also acts as tensile reinforcement material for conduit 100. Other known reinforcing materials may be used with equal effect, for example, polyester, nylon and fiberglass. Electrical power, such as may be provided through the electrical system of a vehicle or piece of equipment is supplied to one end of conduit 100 such as through conductive lead wires 41, 51, or the like. This electrically couples the conduit to a vehicle current source and results in a current flow therethrough. This in turn enables resistance heating of conduit 100 due to the resistive nature of the braids 11, 12.

The supply of electricity is preferably coupled to one end of conduit 100. For example, a first conductor, such as illustrated by lead wire 41, may be conductively coupled to braid 11 through crimp connector 40. Connector 40 engages all strands of braid 11. A second conductor, such as illustrated by lead wire 51, may be conductively coupled to braid 12 through crimp connector 50. Connector 50 engages all strands of braid 12. To facilitate such coupling electrical crimp connectors 40 and 50 are disposed at one end of conduit 100. Wire 41 is connected to connector 40. Wire 51 is connected to connector 50. Connector 40 is electrically isolated from connector 50 by a gap or insulating material. Braids 11, 12 may be interlaced having a braid 11 adjacent to a braid 12 in order to moderate the heating across the width and length of conduit 100, thereby avoiding hotspots. Braid 11 and braid 12 are electrically connected in series at one end by connector 30.

The vehicle or other electrical power supply provides a voltage across conductive braids 11 and 12 with a resulting current flow through conduit 100 which causes the hose to heat resistively due to the electrically conductive nature of the material making up the braids 11, 12. Conductors 41, 51 are disposed within an insulating sleeve 20, or in a further outer covering of the hose. Insulating sleeve 20 may be made of any material which sufficiently retains the heat generated by braids 11, 12, for example, such as closed cell rubber foam, EPDM, fiberglass, cellulose and mineral wool to name a few. Sleeve 20 is flexible. The insulating sleeve serves to reduce power consumption of the device. The fluid conduit 100 can also be a tube comprising a plastic or polymer.

The current flow circuit through conduit 100 is from conductor 41, to connector 40 to braid 11, then to connector 30 to braid 12, and then to connector 50 and to conductor 51. The power is connected across conductors 41 and 51. Current flow may be reversed with equal effect.

The circuit can also be used to transmit signals for example, control signals or data signals relating to operating conditions such as current, temperature and voltage.

Quick connector couplings 60, 70 are provided at each end of conduit 100 to allow connection to a vehicle system. The quick connect nature of couplings 60, 70 allow for rapid replacement or installation of the hose in an engine or other application. Couplings 60, 70 may comprise any one of a number of quick connect couplings known in the art.

Figure 2:
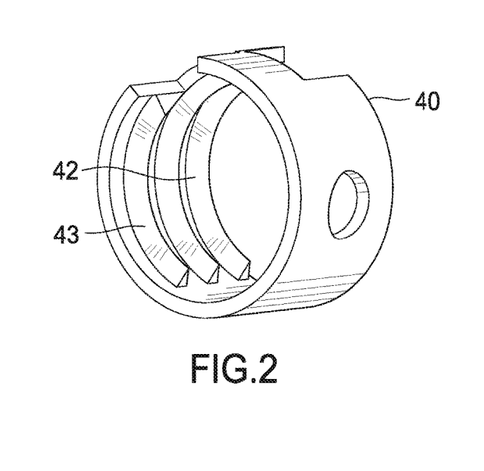
FIG. 2 is a perspective view of a crimp connector.

FIG. 2 is a perspective view of a crimp connector. Connector 40 comprises one or more ridges 42 which extend inward from an inner surface. Each ridge 42 extends in a circumferential direction for approximately up to 170 degrees. Each ridge 42 has a sharp end 43 which penetrates sleeve 20 upon being crimped to electrically engage braid 11. Lead wire 41 is connected to connector 40.

Figure 3:
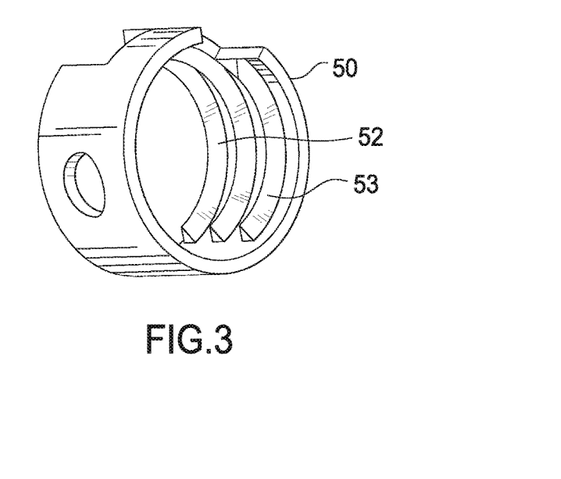
FIG. 3 is a perspective view of a crimp connector.

FIG. 3 is a perspective view of a crimp connector. Connector 50 comprises one or more ridges 52 which extend inward from an inner surface. Each ridge 52 extends in a circumferential direction for approximately up to 170 degrees. Each ridge 52 has a sharp end 53 which penetrates sleeve 20 upon being crimped to electrically engage braid 12. Lead wire 51 is connected to connector 50.

Figure 4:
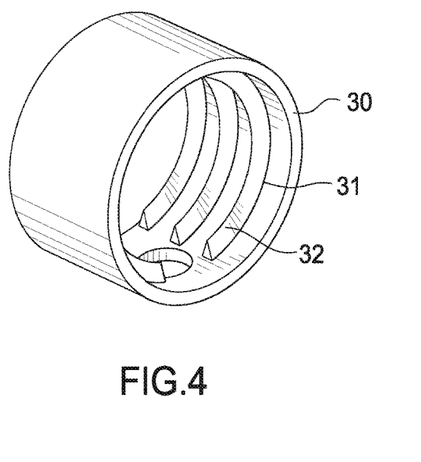
FIG. 4 is a perspective view of a crimp connector.

FIG. 4 is a perspective view of a crimp connector. Connector 30 comprises one or more ridges 31 which extend inward from an inner surface. Each ridge 31 extends in a circumferential direction for approximately up to 300 degrees. Each ridge 31 has a sharp end 32 which penetrates sleeve 20 upon being crimped to electrically engage both braids 11 and 12.

Figure 5:
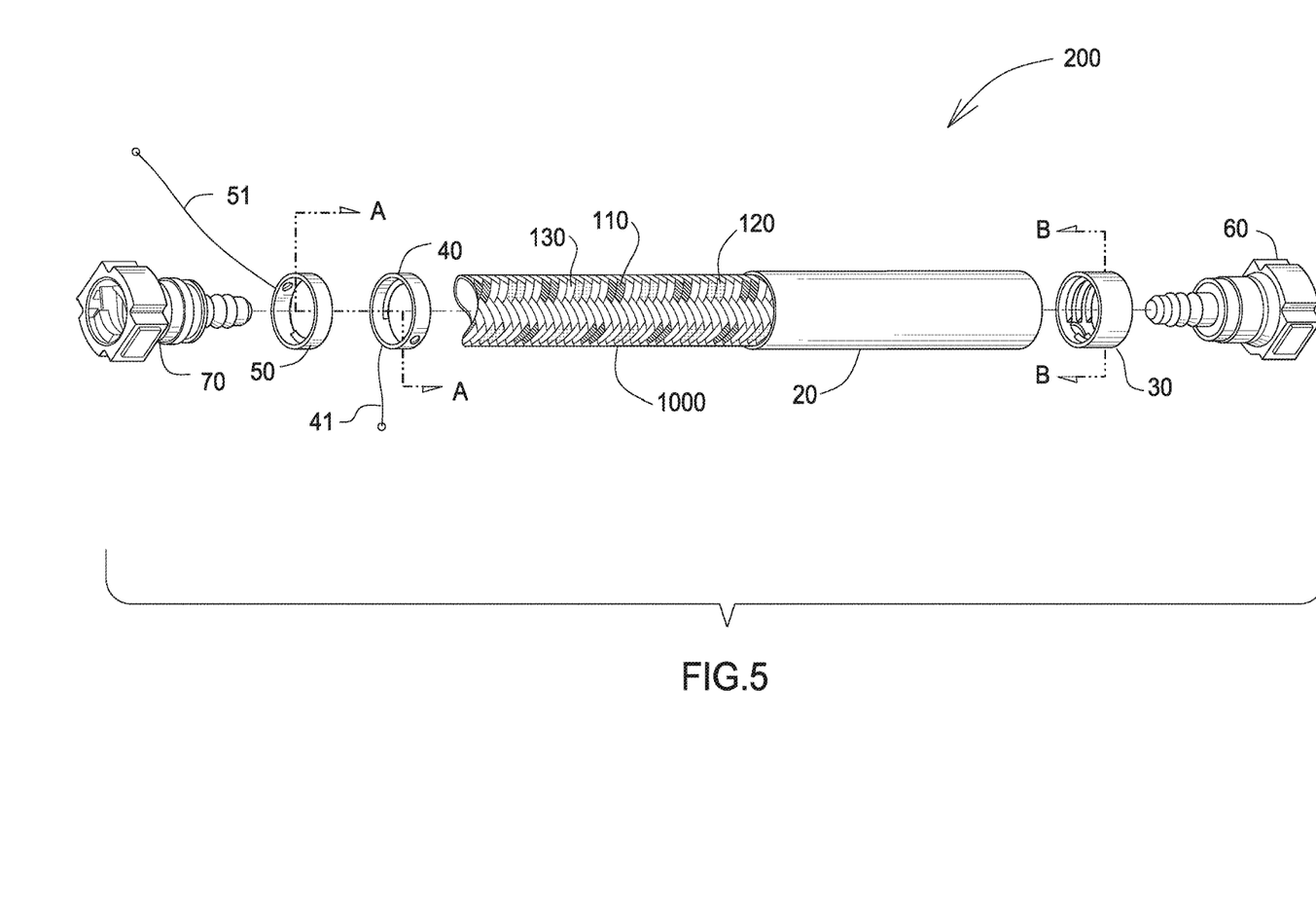
FIG. 5 is an exploded view of an alternate embodiment of the inventive hose.

FIG. 5 is an exploded view of an alternate embodiment of the inventive hose. A fluid conduit 200 is shown having body 20 with conductive portion 1000 disposed therein. The conductive material may take the form of a woven or braided semi-conductive carbon fiber textile material comprising conductive spiral braids 110 and 120. Braids 110, 120 may also comprise conductive materials including metallic substances. Each conductive spiral braid 110, 120 is parallel to the other and are electrically isolated from each other by an insulating portion 130. Each braid 110, 120, comprises a resistivity which results in a temperature increase upon application of an electric current. In this embodiment each braid 110, 120 comprise fewer strands than braids 11, 12. Braids 110, 120 may be interlaced having a braid 110 adjacent to a braid 120 in order to moderate the heating across the width and length of conduit 200, thereby avoiding hotspots. Each braid 110, 120 comprises multiple parallel conductive threads or strands extending the length of conduit 200. Braid 110 and braid 120 are electrically connected in series at one end by connector 30.

Portion 1000 further comprises carbon fiber reinforcement material. Preferably, the carbon fiber material acts as tensile reinforcement material for conduit 200. Other known reinforcing materials may be used with equal effect, for example, polyester, nylon and fiberglass. Electrical power, such as may be provided through the electrical system of a vehicle, facility supply or piece of equipment is supplied to one end of conduit 200 such as through conductive lead wires 41, 51, or the like. This electrically couples the conduit to a current source and a current flows therethrough. This in turn enables resistance heating of conduit 200 due to the resistive nature of the braids 110, 120.

The supply of electricity to the conduit is preferably coupled to one end of conduit 200. For example, a first conductor, such as illustrated by lead wire 41, may be conductively coupled to braid 110 through connector 40. Connector 40 engages all strands of braid 110. A second conductor, such as illustrated lead wire 51, may be conductively coupled to braid 120 through connector 50. Connector 50 engages all strands of braid 120. To facilitate such coupling electrical crimp connectors 40 and are disposed at one end of hose 200. Wire 41 is connected to connector 40. Wire 51 is connected to connector 50.

The electrical power supply provides a voltage across conductors 110 and 120 with a resulting current through conduit 200 which causes the hose to heat resistively due to the electrically resistive nature of the material making up each braid 110, 120. Conductors 41, 51 may be at least partially disposed either within insulating sleeve 20. Insulation sleeve 20 may be made of any material which sufficiently retains the heat generated by braids 110, 120, such as closed cell rubber foam. Preferably, sleeve 20 is flexible. The fluid conduit 200 could also be a tube, such as a plastic or metal tube. Quick connector couplings 60, 70 are provided at each end of hose 200. The quick connect nature of couplings 60, 70 allow for rapid replacement or installation of the conduit in an engine or other application. Couplings 60, 70 may comprise any one of a number of quick connect couplings known in the art.

In each embodiment braid 11, 12 and 110, 120 are electrically connected in series through connector 30. The circuit runs from lead wire 41 through connector 40 to braid 11 or 110 to connector 30. Then from connector 30 through braid 12 or 120 to connector 50 and then to lead wire 51. Braids 11, 12 and braids 110,120 each comprise a plurality of parallel strands. Hence the multiple strands in each braid are electrically parallel while the overall circuit from lead wire 41 to lead wire 51 is a series circuit.

The resistance at an operating temperature of approximately 10 degrees F. for each braid 11, 12 and braid 110, 120 is in the range of approximately 1 to 100Ω for a hose one meter in length and outside diameter of 8 mm. When connected to a typical 12V vehicle electrical system the power density of the inventive conduit at 10 degrees F. is in the range of approximately 5 W/m$^2$ to approximately 600 W/m$^2$. A single circuit embodiment such as shown in FIG. 1 might heat fluid in a conduit from −20 degrees F. to about 10 degrees F. in approximately 30 minutes, while a circuit embodiment such as illustrated in FIG. 5 might heat the fluid in the conduit from −20 degrees F. to about 10 degrees F. in less than approximately 20 minutes. The examples including the numeric values described herein are offered only for illustrative purposes and are not intended to limit the scope or applicability of the invention.

Figure 6:
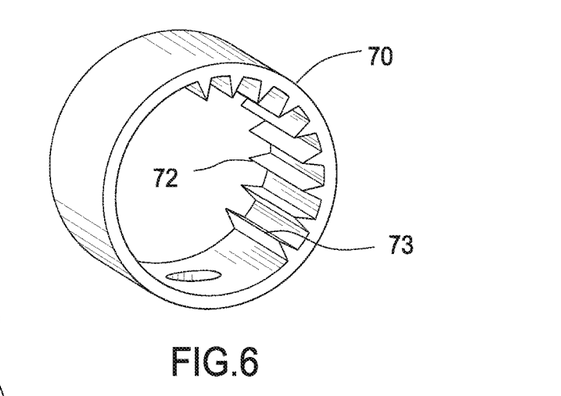
FIG. 6 is a perspective view of a crimp connector.

FIG. 6 is an alternate embodiment of a connector. Connector 70 comprises one or more ridges 72 which extend inward from an inner surface. Each ridge 72 extends in a longitudinal direction. Ridges 72 occupy approximately up to 170 degrees of the circumference. Each ridge 72 has a sharp end 73 which penetrates sleeve 20 upon being crimped to electrically engage braid 11 or 12. Lead wire 41 can be connected to connector 70. Connector 70 may also replace connector 50 as well.

Figure 7:
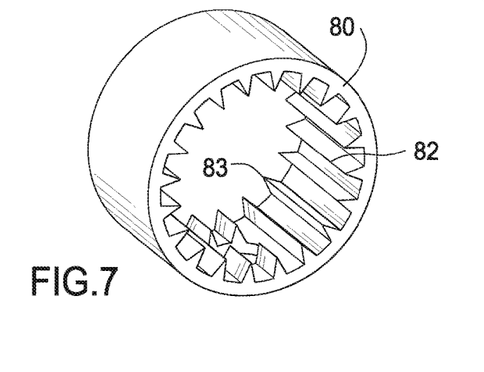
FIG. 7 is a perspective view of a crimp connector.

FIG. 7 is an alternate embodiment a crimp connector. Connector 80 comprises one or more ridges 82 which extend inward from an inner surface. Each ridge 82 extends in a longitudinal direction. Ridges 82 occupy approximately up to 360 degrees of the circumference. Each ridge 82 has a sharp end 83 which penetrates sleeve 20 upon being crimped to electrically engage braid 11 and 12. Connector 80 may replace connector 30.

Figure 8:
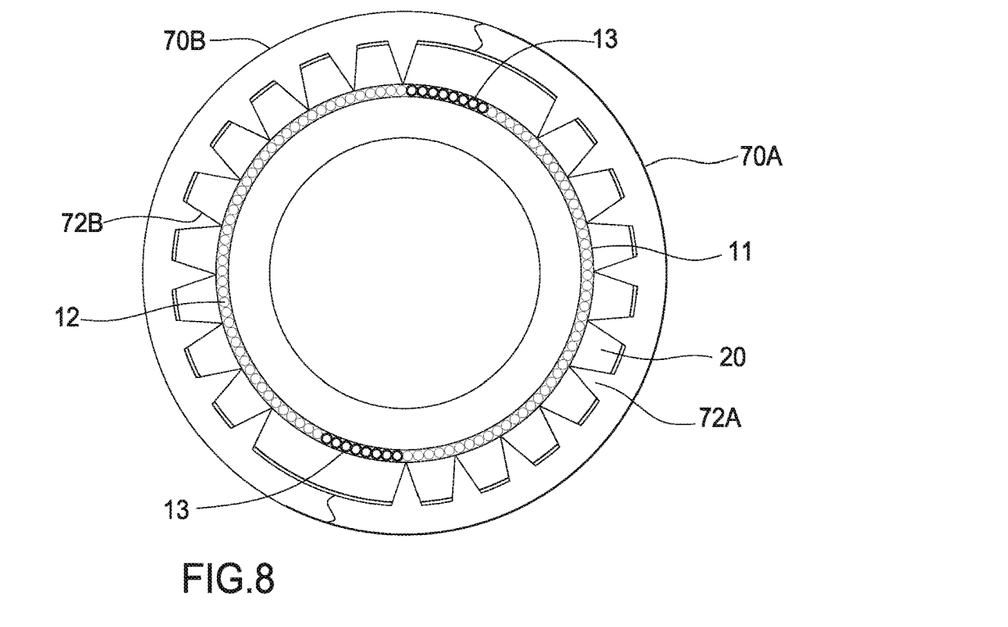
FIG. 8 is a section A-A from FIG. 1.

FIG. 8 is a section A-A from FIG. 1. Ridges 72A of connector 70A are crimped and are shown penetrating cover about hose 100. Each ridge 72A electrically engages braid 11. Ridges 72B of connector 70B are shown penetrating cover 20. Each ridge 72B electrically engages braid 12. Connector 70A and connector 70B are as described for connector 70 in FIG. 6. Insulating portion 13 is also engaged by a ridge 72A but since 13 is an insulator this has no electrical effect.

Figure 9:
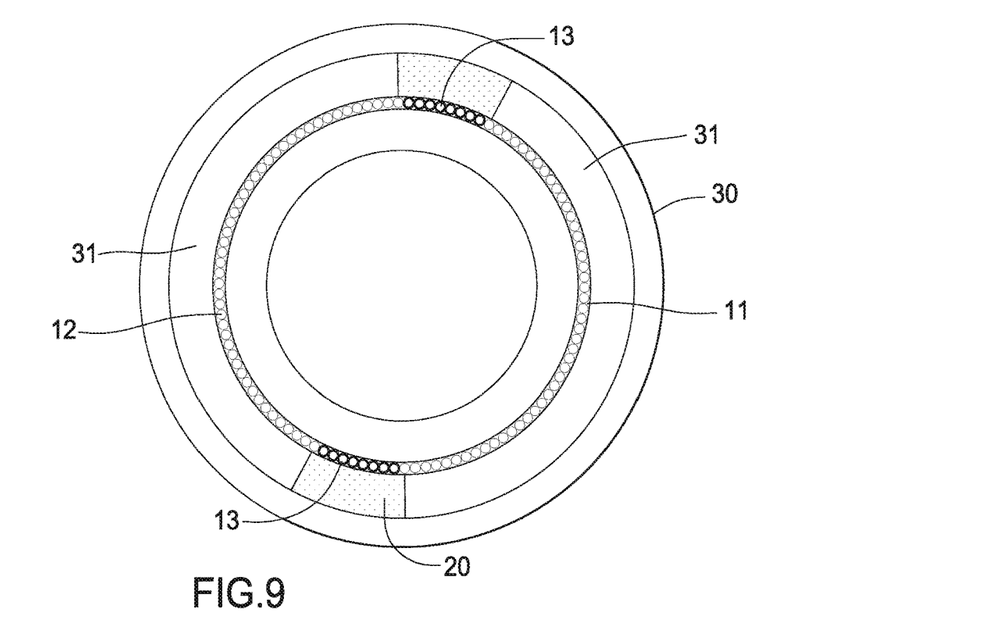
FIG. 9 is section B-B from FIG. 1.

FIG. 9 is section B-B from FIG. 1. Connector 30 is crimped about the conduit. Ridges 31 of connector 30 are crimped and are shown penetrating cover 20 about conduit 100. Each ridge 31 electrically engages braid 11 and 12. Connector 30 is described in FIG. 4. Insulating portion 13 is also engaged by a ridge 31 but since 13 is an insulator this has no electrical effect.

Figure 10:
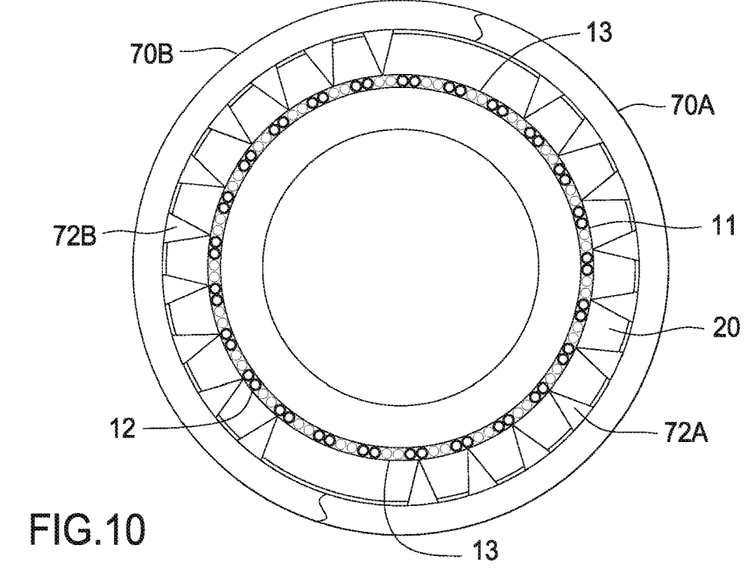
FIG. 10 is a section A-A from FIG. 5.

FIG. 10 is a section A-A from FIG. 5. Ridges 72A of connector 70A are crimped and are shown penetrating cover 20 about conduit 100. Each ridge 72A electrically engages braid 11. Ridges 72B of connector 70B are shown penetrating cover 20. Each ridge 72B electrically engages braid 12. Connector 70A and connector 70B are as described for connector 70 in FIG. 6. Insulating portion 13 is also engaged by a ridge 72B but since 13 is an insulator this has no electrical effect.

Figure 11:
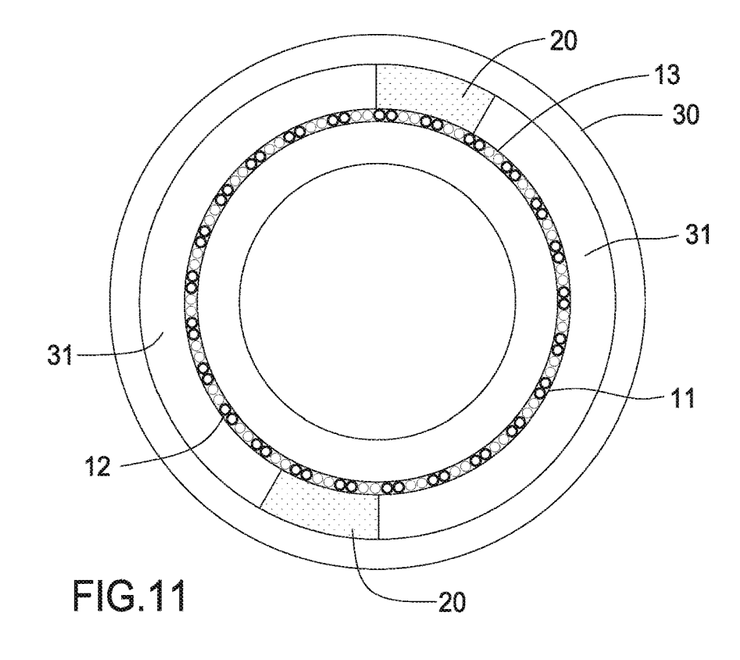
FIG. 11 is section B-B from FIG. 5.

FIG. 11 is section B-B from FIG. 5. Connector 30 is crimped about the conduit. Ridges 31 of connector 30 are crimped and are shown penetrating cover 20 about conduit 100. Each ridge 31 electrically engages braid 11 and 12. Connector 30 is described in FIG. 4.

Additionally, as mentioned above, more than two parallel circuits may be provided in accordance with the present systems and methods. In such embodiments the paired terminals of the power supply may be electrically coupled to the conduit in any number of pairs along the length of the conduit to provide the aforementioned multiple parallel circuits. Some of these embodiments might use switching, or the like, to control operation of such circuits, or even the effective number of circuits. For example, in the embodiment illustrated in FIG. 5 an open switch in braid 110 or 120 could disable the associated circuit. Additionally, or alternatively, a switch might open braid 110 and shunt the output therefrom to braid 120 to provide conduit 200 a single restive heating circuit along its length.

A heated fluid conduit comprising a fluid conduit having a body with a conductive material disposed therein, the conductive material comprising two conductors in adjacent relation, the conductive material comprising a woven material, a first crimp connector on the end of a conductor, and a second crimp connector on the end of the other conductor, and both crimp connectors on the same end of the body, the conductors electrically connected in series by a third crimp connector at the other end of the body conduit, means for coupling an electrical power supply to each conductor to provide a voltage across said conductors and an electrical current therethrough, heating said fluid conduit.

A heated fluid conduit comprising a fluid conduit having a body with a semi-conductive carbon fiber woven material disposed therein and further comprising an insulating cover, the semi-conductive carbon fiber woven material comprising two conductors electrically isolated from each other, a first crimp connector engaging the first conductor and second crimp connector engaging the second conductor, both at the same end of the body, the conductors electrically connected in series by a third crimp connector at the other end of the body which penetrates the insulating cover to electrically engage the first and second conductors, means for connecting an electrical power supply to each first and second crimp connector to form a series circuit and thereby provide a voltage across said conductors and an electrical current therethrough, heating said fluid conduit.

Although forms of the invention have been described herein, it will be obvious to those skilled in the art that variations may be made in the construction and relation of parts and method without departing from the spirit and scope of the invention described herein.

We claim:

1. A heated fluid conduit comprising:
   a fluid conduit having a body with a conductive carbon fiber woven material disposed therein and further comprising an insulating cover;
   the conductive carbon fiber woven material comprising two conductors electrically isolated from each other;
   the conductors electrically connected in series by a crimp connector which penetrates the insulating cover at one end of the fluid conduit;
   the crimp connector comprises one or more ridges extending inward from an inner surface, each ridge having a sharp end for penetrating the insulting cover; and
   means for coupling an electrical power supply to the other end of each conductor in a series circuit and to provide a voltage across said conductors and an electrical current therethrough, heating said fluid conduit.

2. The conduit as in claim 1, wherein the ridges extend circumferentially in a range of approximately 120 degrees to 170 degrees.

3. The conduit as in claim 1, wherein the ridges extend circumferentially up to 300 degrees.

4. The conduit as in claim 1, wherein the ridges extend in a longitudinal direction.

5. A heated fluid conduit comprising:
   a fluid conduit having a body with a semi-conductive carbon fiber woven material disposed therein and further comprising an insulating cover;
   the semi-conductive carbon fiber woven material comprising two conductors electrically isolated from each other;
   a first crimp connector engaging the first conductor and second crimp connector engaging the second conductor, both at the same end of the body;
   the first crimp connector comprises one or more ridges extending inward from an inner surface, each ridge having a sharp end for penetrating the insulting cover;
   the conductors electrically connected in series by a third crimp connector at the other end of the body which penetrates the insulating cover to electrically engage the first and second conductors; and
   means for connecting an electrical power supply to each first and second crimp connector to form a series circuit and thereby provide a voltage across said conductors and an electrical current therethrough, heating said fluid conduit.

6. The heated fluid conduit as in claim 5, wherein the first crimp connector and the second crimp connector each comprises one or more ridges extending inward from an inner surface, each ridge having a sharp end for penetrating the insulting cover.

* * * * *

UNITED STATES PATENT AND TRADEMARK OFFICE
CERTIFICATE OF CORRECTION

PATENT NO. : 10,197,203 B2
APPLICATION NO. : 15/597488
DATED : February 5, 2019
INVENTOR(S) : Thomas Moss, III, Alex Warneke and Tim Saupe It is certified that error appears in the above-identified patent and that said Letters Patent is hereby corrected as shown below:

In the Claims

Column 7 Line 13 and Column 8 Lines 10 and 25, each occurrence of "insulting" should read --insulating--

Signed and Sealed this
Fourteenth Day of July, 2020

Andrei Iancu
*Director of the United States Patent and Trademark Office*